(12) United States Patent
Loaiza et al.

(10) Patent No.: US 7,447,786 B2
(45) Date of Patent: Nov. 4, 2008

(54) EFFICIENT LOCKING OF SHARED DATA THAT IS ACCESSED FOR READS IN A CLUSTER DATABASE

(75) Inventors: Juan Loaiza, Redwood City, CA (US); Sashikanth Chandrasekaran, San Jose, CA (US); Neil Macnaughton, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 11/418,782

(22) Filed: May 5, 2006

(65) Prior Publication Data

US 2006/0212573 A1    Sep. 21, 2006

Related U.S. Application Data

(63) Continuation-in-part of application No. 10/435,229, filed on May 9, 2003.

(51) Int. Cl.
*G06F 13/00* (2006.01)
(52) U.S. Cl. ........................ 709/229; 710/200
(58) Field of Classification Search ................ 709/229; 710/200
See application file for complete search history.

(56) References Cited

U.S. PATENT DOCUMENTS

| | | | |
|---|---|---|---|
| 3,964,029 A | 6/1976 | Babb | |
| 4,118,788 A | 10/1978 | Roberts | |
| 4,255,796 A | 3/1981 | Gabbe et al. | |
| 4,435,766 A | 3/1984 | Haber et al. | |
| 4,606,002 A | 8/1986 | Waisman et al. | |
| 4,677,550 A | 6/1987 | Ferguson | |
| 4,769,772 A | 9/1988 | Dwyer | |
| 4,774,657 A | 9/1988 | Anderson et al. | |
| 4,811,199 A | 3/1989 | Keuchler et al. | |
| 4,811,217 A | 3/1989 | Tokizane et al. | |
| 4,814,971 A | 3/1989 | Thatte | |
| 4,817,036 A | 3/1989 | Millett et al. | |
| 4,827,462 A | 5/1989 | Flannagan et al. | |
| 4,829,427 A | 5/1989 | Green | |
| 4,945,475 A | 7/1990 | Bruffey et al. | |
| 4,947,320 A | 8/1990 | Crus et al. | |
| 4,956,774 A | 9/1990 | Shibamiya et al. | |

(Continued)

FOREIGN PATENT DOCUMENTS

EP    286807 A2    10/1988

(Continued)

OTHER PUBLICATIONS

Aldred et al., "A Distributed Lock Manager or Fault Tolerant MPP," IEEE, 1995.

(Continued)

*Primary Examiner*—Kenneth R Coulter
(74) *Attorney, Agent, or Firm*—Hickman Palermo Truong & Becker LLP

(57) ABSTRACT

Described herein are techniques for synchronizing access to resources in a multi node system by establishing a resource as a read-mostly resource based on one or more criteria, and allowing a node to acquire a shared lock, not granted by the master, on the read-mostly resource where no anti-lock exists for the resource.

26 Claims, 6 Drawing Sheets

U.S. PATENT DOCUMENTS

| | | | |
|---|---|---|---|
| 5,043,872 A | 8/1991 | Cheng et al. |
| 5,060,144 A | 10/1991 | Sipple et al. |
| 5,091,852 A | 2/1992 | Tsuchida et al. |
| 5,161,227 A | 11/1992 | Dias et al. |
| 5,202,971 A | 4/1993 | Henson et al. |
| 5,237,678 A | 8/1993 | Kuechler et al. |
| 5,241,648 A | 8/1993 | Cheng et al. |
| 5,251,318 A | 10/1993 | Nitta et al. |
| 5,257,365 A | 10/1993 | Powers et al. |
| 5,285,528 A | 2/1994 | Hart |
| 5,287,521 A | 2/1994 | Nitta et al. |
| 5,325,525 A | 6/1994 | Shane et al. |
| 5,394,531 A | 2/1995 | Smith |
| 5,398,199 A | 3/1995 | Lefons |
| 5,403,639 A | 4/1995 | Belsan et al. |
| 5,408,653 A | 4/1995 | Josten et al. |
| 5,410,697 A | 4/1995 | Baird et al. |
| 5,432,919 A | 7/1995 | Falcone et al. |
| 5,440,732 A | 8/1995 | Lomet et al. |
| 5,440,743 A | 8/1995 | Yokota et al. |
| 5,442,763 A | 8/1995 | Bartfai et al. |
| 5,452,447 A | 9/1995 | Nelson et al. |
| 5,454,108 A | 9/1995 | Devarakonda et al. |
| 5,511,178 A | 4/1996 | Takeda et al. |
| 5,551,027 A | 8/1996 | Choy et al. |
| 5,551,046 A | 8/1996 | Mohan et al. |
| 5,590,308 A | 12/1996 | Shih |
| 5,596,754 A | 1/1997 | Lomet |
| 5,612,865 A | 3/1997 | Dasgupta |
| 5,619,675 A | 4/1997 | Martine et al. |
| 5,649,196 A | 7/1997 | Woodhill et al. |
| 5,682,537 A | 10/1997 | Davies et al. |
| 5,689,255 A | 11/1997 | Frazier et al. |
| 5,758,359 A | 5/1998 | Saxon |
| 5,761,659 A | 6/1998 | Bertoni et al. |
| 5,768,532 A | 6/1998 | Megerian |
| 5,778,395 A | 7/1998 | Whiting et al. |
| 5,778,442 A | 7/1998 | Ezzat et al. |
| 5,829,001 A | 10/1998 | Li et al. |
| 5,845,318 A | 12/1998 | Rose et al. |
| 5,892,945 A | 4/1999 | Mirchandaney et al. |
| 5,893,086 A | 4/1999 | Schmuck et al. |
| 5,949,876 A | 9/1999 | Ginter et al. |
| 5,963,960 A | 10/1999 | Swart et al. |
| 5,963,963 A | 10/1999 | Schmuck et al. |
| 5,970,495 A | 10/1999 | Baru et al. |
| 5,999,712 A | 12/1999 | Moiin et al. |
| 6,014,669 A | 1/2000 | Slaughter et al. |
| 6,023,706 A | 2/2000 | Schmuck et al. |
| 6,026,394 A | 2/2000 | Osborn |
| 6,026,474 A | 2/2000 | Carter et al. |
| 6,038,563 A | 3/2000 | Bapat et al. |
| 6,044,367 A | 3/2000 | Wolff |
| 6,047,283 A | 4/2000 | Braun |
| 6,052,697 A | 4/2000 | Bennett et al. |
| 6,101,495 A | 8/2000 | Tsuchida et al. |
| 6,112,315 A | 8/2000 | Kuruvila et al. |
| 6,144,983 A | 11/2000 | Klots et al. |
| 6,173,313 B1 | 1/2001 | Klots et al. |
| 6,185,601 B1 | 2/2001 | Wolff |
| 6,209,074 B1 | 3/2001 | Dell et al. |
| 6,253,273 B1 * | 6/2001 | Blumenau ............... 710/200 |
| 6,256,773 B1 | 7/2001 | Bowman-Amuah |
| 6,272,491 B1 | 8/2001 | Chan et al. |
| 6,292,795 B1 | 9/2001 | Peters et al. |
| 6,353,836 B1 | 3/2002 | Bamford et al. |
| 6,381,627 B1 | 4/2002 | Kwan et al. |
| 6,453,404 B1 | 9/2002 | Bereznyi et al. |
| 6,496,949 B1 | 12/2002 | Kanevsky et al. |
| 6,529,906 B1 | 3/2003 | Chan |
| 6,668,295 B1 | 12/2003 | Chan |
| 6,708,198 B1 | 3/2004 | Simmons et al. |
| 6,751,616 B1 | 6/2004 | Chan |
| 6,915,387 B1 | 7/2005 | Huffman et al. |
| 6,920,454 B1 | 7/2005 | Chan |
| 6,965,983 B2 | 11/2005 | Chan et al. |
| 7,085,911 B2 | 8/2006 | Sachedina et al. |
| 7,209,990 B2 * | 4/2007 | Pruscino et al. ............. 710/200 |
| 7,246,187 B1 * | 7/2007 | Ezra et al. ................... 710/200 |
| 2002/0147733 A1 | 10/2002 | Gold et al. |
| 2004/0225742 A1 | 11/2004 | Loaiza et al. |
| 2005/0149540 A1 | 7/2005 | Chan et al. |
| 2006/0206901 A1 | 9/2006 | Chan |
| 2006/0224805 A1 | 10/2006 | Pruscino et al. |
| 2006/0265414 A1 | 11/2006 | Loaiza et al. |
| 2006/0265420 A1 | 11/2006 | Macnaughton et al. |
| 2007/0185872 A1 * | 8/2007 | Ho et al. ....................... 707/8 |

FOREIGN PATENT DOCUMENTS

| | | |
|---|---|---|
| WO | WO92/06440 | 4/1992 |

OTHER PUBLICATIONS

Apple, "OpenDoc Cookbook".
Bhide, Anupam, "An Analysis of Three Transation Processing Architectures," Proceedings of the 14th VLDB Conference, Los Angeles, CA., 1988.
Copeland, George et al., "Data Placement In Bubba," ACM, Mar. 1988.
Corba, "Corbaservices: Common Object Services Specification."
Dewitt, David J. et al, A Performance Analysis of the Gamma Database Machine,: ACM, Mar. 1998.
Englert, Susanne, "A Benchmark of NonStop SQL Release 2 Demonstrating Near-Linear Speedup and Scaleup on Large Databases," May 1989.
Hermannsson, G., "Fast Locks in Distributed Shared Memory Systems," System Sciences, 1994, vol. 1: Architecture, Proceedings of the Twenty-Seventh Hawaii International Conference., (abstract only).
Hong Wei et al., "Optimization of Parallel Query Execution Plans in XPRS,", IEEE, Apr. 1991.
Molesky, Lory D. et al., "Database Locking Protocols for Large-Scale Cache-Coherent Shared Memory Multiprocessors: Design, Implementation and Performance," Jun. 6, 1995, pp. 1-24.
Molesky, Lory D et al., "Efficient Locking for Shared Memory Database Systems," Mar. 1994, 28 pages.
Rahm, Erhard, "Concurrency and Coherency Control in Database Sharing Systems," Technical Report ZRI, Dec. 1991, revised Mar. 1993, pp. 1-62.
Tenenbaum, Andrew S., "Structured Computer Organization, second Edition," Prentice-Hall Inc., Copyright 1984, pp. 10-12.
Stonebaraker, Michael et al., "The Design of XPRS," Proceeding of the 14th VLDB Conference, Los Angeles, CA., 1988.
The Tandem Performance Group, "A Benchmark of NonStop SQL on the Debit Credit Transaction," ACM, Mar. 1987.
Office Action from European Patent Application No. 01968979.3-2212, dated Aug. 6, 2004 (3 pgs.).
Current Claims in European Patent Application No. 01968979.3-2212 (3 pgs).
Written Opinion from PCT Patent Application No. PCT/US02/06981 dated Oct. 3, 2004(8 pgs.).
Current Claims in PCT Patent Application No. PCT/US02/06981 (8 pgs.).
Office Action from Canadian Patent Application No. 2,448,050 dated Oct. 1, 2004 (2 pgs).
Current Claims in Canadian Patent Application No. 2, 448,050 (48 pgs).
Dye, Charles, "Multi-Master Replication," Oracle Distributed Systems, Chapter 12, O'Reilly and Associates, Apr. 1999, 54 pages.
Mahapatra, Tushar et al., "Maintaining a Failover Database", Oracle Parallel Processing, Section 12.1, ProQuest Information and Learning, O'Reilly and Associates, Aug. 2000, 6 pages.
Apple, "OpenDoc Cookbook" , Jan. 1996.

Corba, "Corbaservices: Common Object Services Specification." ,Mar. 1995.
Current Claims in European Patent Application No. 01968979.3-2212 (3 pgs), dated Aug. 6, 2004.
Written Opinion from PCT Patent Application No. PCT/US02/06981 dated Mar. 10, 2004.

Current Claims in PCT Patent Application No. PCT/US02/06981 (8 pgs.), dated Mar. 10, 2004.
Current Claims in Canadian Patent Application No. 2, 448,050 (48 pgs), dated Oct. 1, 2004.

* cited by examiner

FIG. 3

```
                    300
                     ↓
        ┌─────────────────────────────────────────────────────┐
        │   INSTANCE REQUESTS EXCLUSIVE LOCK FROM MASTER      │ — 302
        └─────────────────────────────────────────────────────┘
                              ↓
        ┌─────────────────────────────────────────────────────┐
        │ MASTER SENDS MESSAGES TO ALL NODES REFLECTING THE REQUEST │ — 304
        └─────────────────────────────────────────────────────┘
                              ↓
        ┌─────────────────────────────────────────────────────┐
        │ NODES RELEASE ANY SHARED LOCKS ON THE DATA AND ALLOCATE │ — 306
        │        ANTI-LOCKS ON THE BLOCK OF DATA              │
        └─────────────────────────────────────────────────────┘
                              ↓
        ┌─────────────────────────────────────────────────────┐
        │ MESSAGE SENT TO MASTER INDICATING EXCLUSIVE LOCK NO LONGER NEEDED │ — 308
        └─────────────────────────────────────────────────────┘
                              ↓
        ┌─────────────────────────────────────────────────────┐
        │ MASTER INSTRUCTS NODES TO CLOSE ANTI-LOCKS ON THE BLOCK OF DATA │ — 310
        └─────────────────────────────────────────────────────┘
```

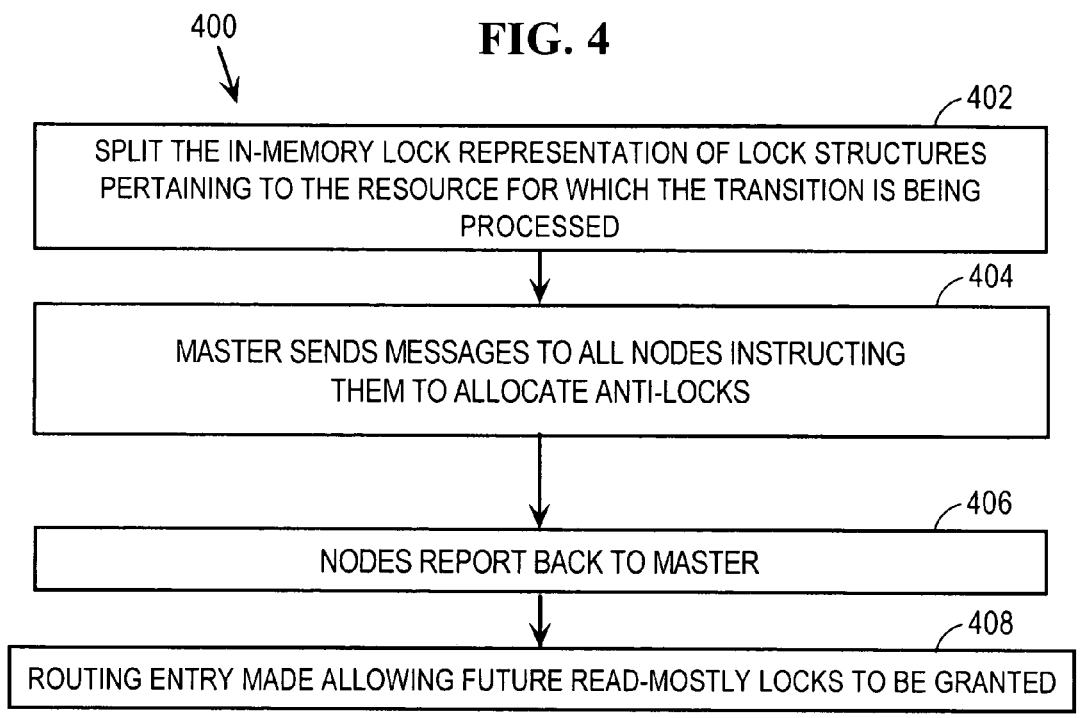

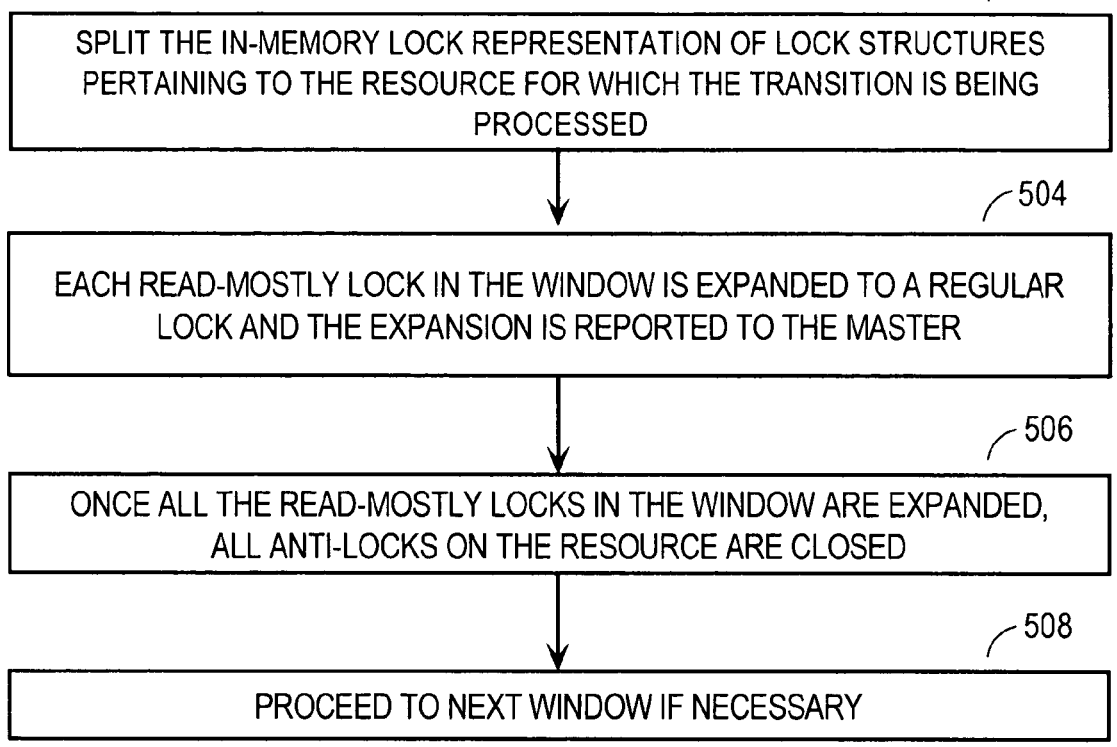

EFFICIENT LOCKING OF SHARED DATA THAT IS ACCESSED FOR READS IN A CLUSTER DATABASE

PRIORITY CLAIM AND CROSS-REFERENCE TO RELATED APPLICATIONS

This application is related to U.S. patent application Ser. No. 10/435,229, filed on May 9, 2003 entitled "Using Local Locks for Global Synchronization in Multi-Node Systems", by Juan R. Loaiza, now U.S. Pat. No. 7,376,744, Neil James Scott Macnaughton and Sashikanth Chandrasekaran, which is related to prior U.S. patent application Ser. No. 11/132,807, filed on May 18, 2005 entitled "Determining Affinity In A Cluster", by Neil James Scott Macnaughton and Sashikanth Chandrasekaran, and U.S. patent application Ser. No. 11/132,811, filed on May 18, 2005 entitled "Creating And Dissolving Affinity Relationships In A Cluster", by Juan R. Loaiza, Neil James Scott Macnaughton and Sashikanth Chandrasekaran. The entire disclosure of all of these aforementioned previously-filed applications are hereby incorporated by reference as if fully set forth herein, and this application claims priority to all aforementioned previously-filed applications.

FIELD OF THE INVENTION

The present invention relates to synchronization mechanisms in computer systems, and in particular, efficiently synchronizing access to resources by nodes in a multi-node systems.

BACKGROUND OF THE INVENTION

Multiple processes running on multi-processing systems may access "shared resources." Some of these shared resources may be accessed by only one process at a time, while others may be accessed concurrently by multiple processes. Consequently, "synchronization mechanisms" have been developed to control access by multiple processes to shared resources. The synchronization mechanism grants locks to processes. Locks grant to holders of the locks the right to access a particular resource in a particular way. Once a lock is granted to a process, the process holds or owns the lock until the lock is relinquished, revoked, or otherwise terminated. Locks are represented by data structures such as semaphores, read/write latches, and condition variables. There are many types of locks. Some types of locks allow shared resources to be shared by many processes concurrently (e.g. shared read lock), while other types of locks prevent any type of lock from being granted on the same resource (exclusive write lock).

The entity responsible for granting locks is referred to herein as a lock manager. In a single node multi-processing system, a lock manager is typically a software component executed and invoked by processes on the node accessing a shared resource.

In contrast to a single node system, a multi-node system consists of network of computing devices or "nodes," each of which may be a multi-processing system. Each of the nodes can access a set of shared resources. Multi-node systems use synchronization mechanisms, referred to as global synchronization mechanisms, to control access to the set of shared resources by nodes in the multi-node system.

A global lock mechanism includes a global lock manager that is responsible for issuing locks to processes on the multi-node system. In order for a node to access a shared resource, it is granted a "global lock" by a global lock manager. A global lock is a lock that can be granted by a global lock manager on a node in a multi-node system to one or more processes on another node to coordinate access to the shared resources among the processes executing on any node in a multi-node system.

One type of global lock manager, a central global lock manager, is responsible for issuing locks for all shared resources in a multi-node system. Another type of global lock manager, a distributed lock manager, is comprised of local lock managers, with one or more of the local lock managers running on each node in a multi-node system. Each lock manager is responsible for coordinating the global locks that are needed to access a subset of shared resources.

Nodes are described herein as performing actions and as being the object of actions. However, this is just a convenient way of expressing that one or more processes on a node are performing an action or is the object of an action. For example, a node accessing a shared resource or granting, holding, or being issued a lock is just a convenient way of expressing that a process on the node is accessing a shared resource or granting, holding, or being issued a lock.

Techniques have been developed for establishing resource-to-master-node assignments based on the affinity between (1) nodes and (2) the objects to which the resources belong. In this context, an "object" may be any entity that includes resources that are protected by locks. The types of resources to which the techniques described herein may be applied may vary based on the type of system in which the techniques are used. For example, within a relational database system, "resources" could include data blocks, tables, table partitions, segments, extents, indexes, Large Objects (LOBs), etc. Within a file system, "resources" could include files, sets of file system metadata, etc. Within a storage system, "resources" could include storage devices, disk sectors, etc.

The "affinity" between a node and an object refers to the degree of efficiency achieved by assigning the node to be the master of the resources that belong to the object. For example, a particular node that accesses a table much more frequently than any other node has a high degree of affinity to the table. Relative to that table, the degree of affinity for that particular node is high because, if that node is assigned to be the master of the resources within the table, a high number of inter-node lock-related communications would be avoided. On the other hand, a node that accesses a table much less frequently than other nodes has a low degree of affinity to the table, because assigning that node to be the master of the table would avoid few inter-node lock-related communications.

While the locking mechanisms described above are usually effective at synchronizing access to resources by nodes in a multi-node systems, problems exist where data is accessed from multiple instances, mostly for reads. While a read must return the most recently updated version of the block, a write must ensure that no other node or instance has a current copy of the block. Various techniques for dealing with this problem incur unnecessary amounts of overhead, among other shortcomings.

If data has affinity to an instance, the mastership for the data is dynamically transferred to this instance and the instance will be able to obtain "affinity locks" for the data. Affinity locks are so termed because they are granted to a master for the resource whose mastership was acquired by affinity. As master, it may create a lock without coordinating with another node and/or lock manager. If the data does not have affinity to a single instance, the mastership for this data may be uniformly distributed across all instances and each instance would obtain regular locks on blocks of the data.

This locking protocol is not efficient if neither of these conditions is satisfied: (1) most of the lock requests are for read locks, which result in very few read-write conflicts, and (2) there is very little read-sharing among instances, as most lock requests result in lock grants followed by a read of that block from disk.

Further, in many cases there will be no affinity and many nodes will be accessing the same piece of data, but different parts of the same piece of data, mostly for reads. In this case, one node should not be assigned to be the master because the other nodes are going to be sending messages to single masters to obtain locks.

In these cases, locking incurs unnecessary overhead. One technique to reduce the locking overhead is to utilize high-performance interconnects with specialized operations. A significant disadvantage, however, is that this technique is not a generic solution and will not work with the ubiquitous UDP/Ethernet IPC stack.

Another technique to reduce the overhead cost of acquiring locks is to use coarse-grain locking. In this scheme, locks are acquired at a higher level of granularity, such as a table or file, instead of a finer level of granularity, such as a row or a disk block. When a lock is acquired at the higher level of granularity, it is implicitly granted for levels of shared data at a finer level of granularity. For example, if a global lock is acquired for an entire table, individual global locks for the rows or blocks for the table are implied and do not have to be acquired, avoiding the cost of obtaining a global lock for each row and block.

One disadvantage to this technique is that when an instance needs to modify data locked by a coarse lock, all instances must release their coarse locks because there is no way of detecting which data is to be modified. This takes a significant amount of time because a single coarse lock can protect several blocks. Further, because the non-modifying instance has released the coarse lock, it must reacquire the coarse lock if it has to access any block that is protected by the coarse lock even though the modifying instance is modifying a completely different block.

Another technique to reduce the overhead cost of acquiring locks is to use hierarchical locking. In this scheme, locks are first acquired at a higher level in the hierarchy, such as a table. If a global lock is acquired at a higher level in the hierarchy, global locks are implicitly granted at the lower level of the hierarchy. When another node subsequently needs to access data in the lower level of the hierarchy, such as a row or a block, in a conflicting mode, the first node de-escalates its lock and acquires locks at the lower level in the hierarchy.

This technique has significant disadvantages. First, it is prone to deadlocks, and it is only applicable when the object being shared has a natural hierarchy, such as a B-Tree. Many objects such as flat files, heap tables and other indexes do not have a natural hierarchy and are not candidates for this type of locking approach.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a flowchart illustrating a technique for efficiently granting an exclusive lock and creating anti-locks according to an embodiment of the invention.

FIG. 4 is a flowchart illustrating a technique for converting an resource from regular locks to read-mostly locks according to an embodiment of the invention.

FIG. 5 is a flowchart illustrating a technique for converting an resource from read-mostly locks to regular locks according to an embodiment of the invention.

DETAILED DESCRIPTION OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In order for a process on a node to access a shared resource for which the node is not a master, the process must first acquire a lock. There are two primary types of locks utilized for accessing data in a multi-node database system: shared and exclusive. Shared locks are used for reading data while exclusive locks are used to modify data.

If a process on a node wishes to read data for which the node is not the master, the node coordinates with the master of the resource. For data primarily accessed for read operations, this coordination causes unnecessary overhead because there are few, if any, read-write conflicts for the master to negotiate.

For resources that are subject to proportionally high shared locking, a protocol referred to herein as the read-mostly protocol, can be used to manage shared and exclusive locks on the resource. Such resources may be designated for and subjected to the read-mostly protocol under conditions further described herein. Resources for which a read-mostly protocol is used to coordinate locking are referred to herein as read-mostly resources.

When a node wishes a shared lock on a read-mostly resource, it unilaterally grants itself a "read-mostly lock", that is, grants itself the lock without undertaking messaging with a master or other node to coordinate acquisition of the lock. Thus, the messaging overhead of requesting a lock with a master is avoided.

While a read-mostly lock for a resource may be unilaterally acquired by a node, a node seeking an exclusive lock on a resource must request the exclusive lock from the master of the resource. To grant the exclusive lock on the resource, the master must ensure that other nodes do not have a shared lock (or other form of lock) despite not knowing which other nodes have unilaterally acquired a read-mostly lock, and must block other nodes from unilaterally acquiring a read-mostly shared lock once the exclusive lock is granted despite the fact that the other nodes do not request a read-mostly lock from the master. To this end, the master grants an "anti-lock" for the resource to the other nodes. The granting of an anti-lock to a node is not completed unless that node does not have a shared lock or relinquishes a shared lock. While the other nodes hold the anti-lock on the resource, the other nodes do not unilaterally grant themselves a read-mostly lock on the resource.

Illustrative System

Figure 1:
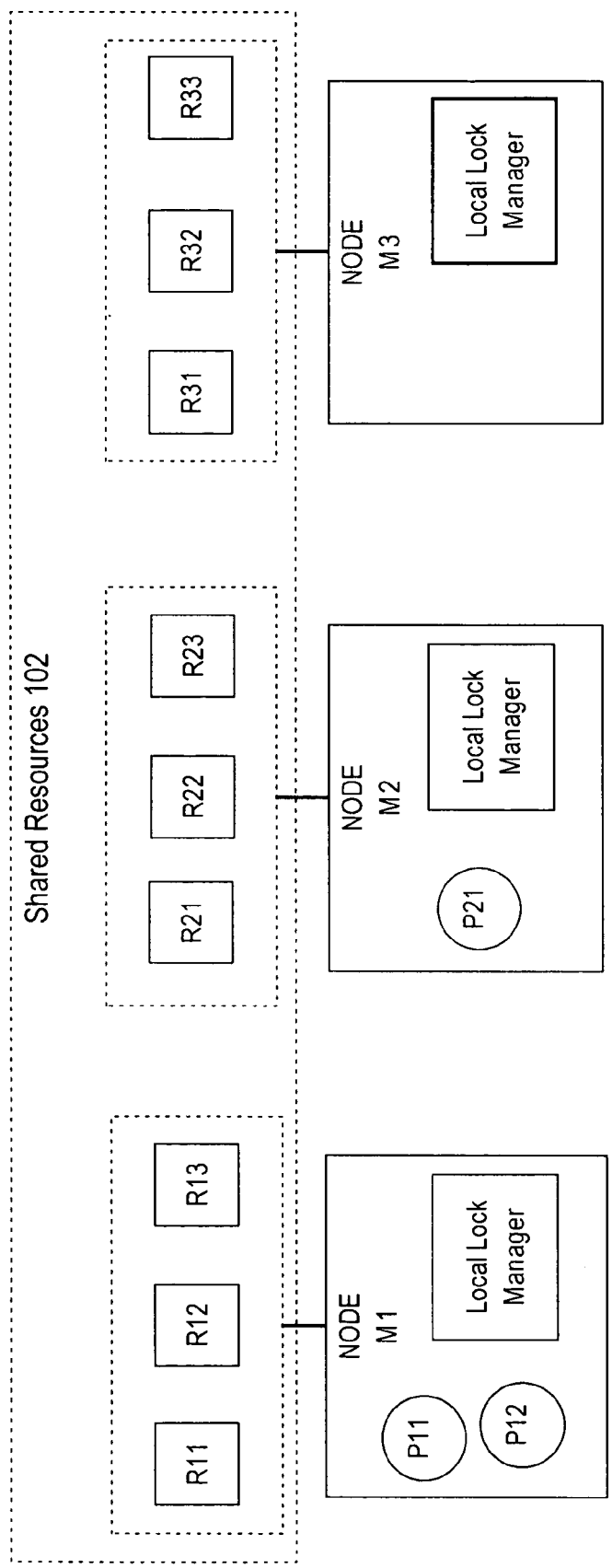
FIG. 1 is a block diagram that depicts a multi-node system upon which an embodiment of the present invention may be implemented.

FIG. 1 is a block diagram depicting a multi-node system 101 system upon which an embodiment of the present invention may be used. Referring to FIG. 1, multi-node system 101 includes node M1, node M2, and node M3. Nodes M1, M2, and M3 access shared resources 102. Shared resources can be any kind of computer resource, including volatile and non-volatile memory, input/output peripheral devices, and data stored in non-volatile or volatile memory (e.g. database data blocks, a file or portion thereof, buffers in memory that hold such data). Access to shared resources by nodes M1, M2, and M3 is controlled by a global synchronization mechanism that includes a distributed lock manager with a local lock manager on each of nodes M1, M2, and M3.

Each of nodes M1, M2, and M3 are assigned as masters to a subset of shared resources 102. Node M1 is the master of shared resources R11, R12, and R13, node M2 is the master of shared resources R21, R22, and R23, and node M3 is the master of shared resources R31, R32, and R33. Shared resources to which access is governed by a master node are referred to as being mastered by that node.

Multi-node system 101 may be a shared everything system, a shared disk system, or a shared nothing system. In a shared everything system, processes on all processors have direct access to all volatile memory devices and to all disks (or other static memory devices) in the system. In shared disk systems, processors and memories are grouped into nodes. Each node in a shared disk system may itself constitute a shared everything system that includes multiple processors and multiple memories. Processes on all processors can access all disks in the system, but only the processes on processors that belong to a particular node can directly access the memory within the particular node. In shared nothing systems, all processors, memories and disks are grouped into nodes. In shared nothing systems as in shared disk systems, each node may itself constitute a shared everything system or a shared disk system. Only the processes running on a particular node can directly access the memories and disks within the particular node.

Acquiring Read-Mostly Locks for Data Mostly Accessed for Reads

According to an embodiment, resources with accesses that fall under an access pattern of mostly reads are designated as read-mostly resources. In order to determine whether a resource falls under an access pattern of mostly reads, an in-memory table is utilized to map object numbers to the number of read locks and write locks that have been granted to each instance. According to an embodiment, the in-memory table also tracks whether a read-lock was a result of a lock grant or a block transfer. An embodiment of this in-memory table is described in greater detail in Related Application, U.S. patent application Ser. No. 11/132,807, filed on May 18, 2005 entitled "Determining Affinity In A Cluster", by Neil James Scott Macnaughton and Sashikanth Chandrasekaran.

Figure 2:
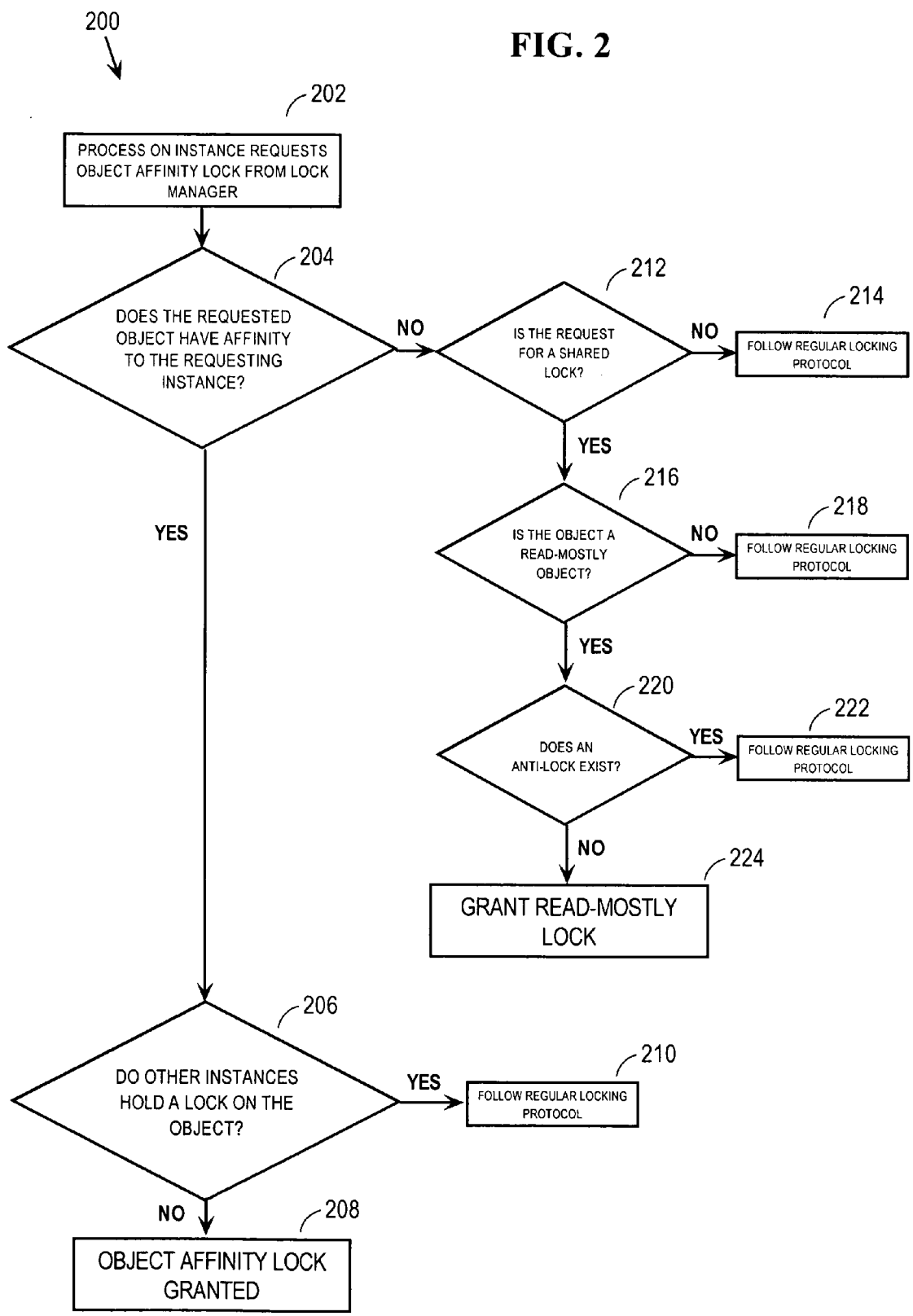
FIG. 2 is a flowchart illustrating a technique for efficiently granting a shared lock for data mostly accessed for reads according to an embodiment of the invention.

FIG. 2 is a flowchart 200 illustrating a technique for incorporating read-mostly protocol into lock management procedures of multi-node system, according to an embodiment of the present invention.

Referring to FIG. 2, at step 202, when a process on a node seeks a shared lock on a resource, it first requests an object affinity lock from the lock manager. Object affinity locks are described in greater detail in the Related Applications. In step 204, a determination is made whether the object sought to be accessed has affinity to the requesting instance. If the affinity exists, then a determination is made whether other instances hold a lock on the object 206. If not, then an object affinity lock is granted 208 as described in the Related Applications; otherwise, the regular locking protocol of sending a message to the master is followed 210.

If the object sought to be accessed does not have affinity to the requesting instance, then a determination is made of whether the request is for a shared lock 212. If not, the regular locking protocol of sending a message to the master is followed 214. According to an embodiment, if no affinity currently exists but most of the locks are owned by one instance, then the lock manager may initiate a remastering request for the object to the requesting instance, thereby resulting in an object affinity lock. The remastering request may be issued and performed in the background and is not necessarily part of the process of requesting a lock.

If the request is for a shared lock 212, then a determination is made whether the object sought to be accessed is a read-mostly object, as discussed further herein 216. If not, the regular locking protocol of sending a message to the master is followed 218. If yes, then a determination is made whether an anti-lock, as described further herein, exists for the particular block sought to be accessed 220. If an anti-lock exists, then the regular locking protocol of sending a message to the master is followed 222. If no anti-lock exists, the lock manager grants a "read-mostly lock" 224 as discussed further herein.

According to an embodiment, this allows multiple instances to acquire shared locks on specific pieces of data with a function call instead of incurring the overhead of multiple messages to the master for the data.

Using Anti-Locks with Exclusive Locks

Anti-locks are placeholders used by nodes to indicate which blocks of data are subject to exclusive locks by an instance. According to an embodiment, the anti-lock works in conjunction with the techniques for read-mostly locking in that if an anti-lock exists for a block of data, no read-mostly lock may be granted for that piece of data. This allows the lock manager to grant the read-mostly locks without having to consult the master for the data.

FIG. 3 is a flowchart 300 illustrating a technique for efficiently granting an exclusive lock and creating anti-locks according to an embodiment of the invention. In step 302, when an instance desires to access a resource for a write, it requests an exclusive lock from the master for the resource. In step 304, the master sends a message reflecting the request to every node in the multi-node database because the master doesn't know which, if any, instances have acquired shared locks on the data. In step 306, once each node receives the message, it releases any shared locks it may have. In addition, according to an embodiment of the invention, each node allocates an anti-lock for the block of data sought to be accessed and responds to the master, which then grants an exclusive lock to the requesting instance.

The anti-lock prevents instances from creating read-mostly locks because the instance first checks whether an anti-lock exists for the block before trying to open read-mostly locks. The anti-locks are maintained in each instance regardless of whether the instance ever accesses the block. Because the anti-locks are on a block-by-block basis, instances accessing other pieces of data within the resource or file are not affected.

Unlike regular locks, nodes cannot close anti-locks unless instructed to do so by the master or access patterns change such that read-mostly locking is abandoned. For example, if an instance detects that there are too many anti-locks, usually because of a large number of exclusive locks, then the instance may initiate a transition out of read-mostly locking. The in-memory table, as discussed earlier, is utilized to track and maintain the anti-lock structures. According to an embodiment, anti-locks utilize the same data structure that the lock manager uses to determine if a node has a lock on a particular block or resource. For example, when an instance needs a shared lock, it may go through the regular lock manager structure and find an anti-lock, which then forces the instance to use the regular locking protocol. According to an alternate embodiment, alternate data structures such as a hash table may be utilized to block instances from acquiring read-mostly locks.

In step 308, after an instance writes the block out to disk or otherwise closes the exclusive lock, it sends a message to the master reflecting the change. In step 310, the master then sends messages to all nodes instructing them to close the anti-lock being held on that block of data. This allows for future read-mostly locks to be obtained on that data.

Switching In and Out of Read-Mostly Locking

As discussed earlier, according to an embodiment of the invention, an in-memory table may be utilized to map object numbers to the number of read and write locks that have been granted to each instance. According to an embodiment, for read locks only, the in-memory table further tracks whether the read lock was the result of a lock grant or block transfer. A block transfer occurs when a master having a lock on a block forwards the block to an instance requesting a read lock on the block. If an instance other than the master has a lock and there is spare CPU, the master forwards the read lock request to the instance that has the read lock on the block. Because there is spare CPU, it is more efficient to transfer the block from the remote instance instead of granting a shared lock to the requesting instance and having it read the block from disk.

According to an embodiment of the invention, the techniques described herein for read-mostly locking work in concert with other locking protocols such as regular locks and object affinity locks, although the techniques described herein do not require the existence of object affinity locking protocols. With the existence and concomitant use of separate locking protocols, it is desirable to provide techniques for alternating between locking protocols based upon such characteristics as access patterns.

According to an embodiment, the techniques described herein partition the in-memory lock representation of lock structures pertaining to the resource for which the transition is being processed into windows, as described in prior U.S. patent application Ser. No. 10/832,527, filed on Apr. 26, 2004 entitled "Techniques for Multiple Window Resource Remastering Among Nodes of a Cluster", by Wilson Wai Shun Chan, Sashikanth Chandrasekaran and Tolga Yurek.

FIG. 4 is a flowchart 400 illustrating a technique for converting a resource from regular locks to read-mostly locks according to an embodiment of the invention. According to one embodiment, the transition between regular locking to read-mostly locking occurs one window at a time. In step 402, the in-memory lock representation of lock structures pertaining to the resource for which the transition is being processed is split, as described in more detail in prior U.S. patent application Ser. No. 10/832,527 as stated above. According to an embodiment, the set of buckets into which an object's locks would map is split into windows. This allows the transition to occur without freezing the entire resource. Each of the masters is aware of all the exclusive locks granted to resources that it masters in each window.

In step 404, for each exclusive lock in the window, the master sends messages to all nodes instructing them to allocate anti-locks. Each node in the cluster can be a master for some subset of the exclusive locks; hence, this step is executed by all nodes. During this step, a node which happens to be a master for an exclusive lock will send a message to allocate anti-locks to all nodes, except the node that owns the exclusive lock. According to an embodiment, the sending node may send a message to itself, by way of a function call. During this step, the same node may receive a message from a different master to allocate an anti-lock for another resource. At the end of this step, all exclusive locks in the window will have anti-locks allocated in all nodes other than the node that owns the exclusive lock.

In step 406, each node reports back to the master, thereby indicating that the window is complete and the next window may be transitioned. In step 408, a routing entry is allocated for the resource in the routing tables so that new requests for shared locks can be satisfied using read-mostly locks.

According to an embodiment, it may be desirable to transition from read-mostly locking to regular locking when there is a proliferation of anti-locks which are using memory. This may be an indication that access patterns have changed from read-mostly accesses to write accesses.

According to one embodiment, the transition between from read-mostly locking to regular locking occurs one window at a time. FIG. 5 is a flowchart 500 illustrating a technique for converting a resource from read-mostly locks to regular locks (i.e., a lock that is granted by the master such as global locks and affinity locks). In step 502, the in-memory lock representation of lock structures pertaining to the resource for which the transition is being processed is split, as described in more detail in prior U.S. patent application Ser. No. 10/832,527 as stated above. According to an embodiment, the set of buckets into which an object's locks would map is split into windows. This allows the transition to occur without freezing the entire resource. Each of the masters are aware of all the exclusive locks in each window.

In step 504, each read-mostly lock in the window is expanded to a regular lock and the expansion is reported to the master. Once the process for a window has begun, no more read-mostly locks may be opened for the window. In step 506, once all the read-mostly locks in the window are expanded, all anti-locks on the resource are closed because they are no longer needed in the regular locking protocol. In step 508, the process proceeds to the next window, if there is one.

Node Join and Node Death

Nodes may join or be removed from the multi-node system for various reasons. According to an embodiment, when a node joins the multi-node system, an entry in the in-memory table for the joining node is created for each resource that has read-mostly locks. Anti-locks are created for every read-mostly resource that has an exclusive lock which has been granted to any of the existing nodes of the multi-node system. The set of all exclusive locks is identical to the set of all anti-locks, because for every read-mostly resource that has an exclusive lock, a node will either have been granted the exclusive lock or would have allocated an anti-lock. Thus, a set union of the list of exclusive locks and anti-locks on read-mostly resources can be constructed from any of the existing nodes in the multi-node system. The list of exclusive locks for a read-mostly resource can be quickly determined by scanning an object queue or similar data structure. The list of anti-locks can also be quickly determined by scanning the lock data structures.

According to an embodiment, upon the death of a node, resources that were mastered by a dead node are remastered among the surviving nodes. These include read-mostly resources as well as regular resources. Each surviving node would have created an anti-lock for any exclusive lock that the dead node may have acquired; therefore, the surviving nodes can continue to acquire read-mostly locks for all resources that were not covered by exclusive locks in the dead node even before recovery is completed.

After recovery is complete, the anti-locks created for the exclusive locks that the dead node may have acquired can be closed. The list of exclusive locks that the dead node may have acquired can be determined in two ways. If the master node for the exclusive lock is a surviving node, the master node can instruct the surviving nodes to close their anti-locks after the recovery of the dead node is completed. If the master node for the exclusive lock is also the dead node, the new master for the said resource can send messages to close the anti-locks after recovery is complete.

Hardware Overview

Figure 6:
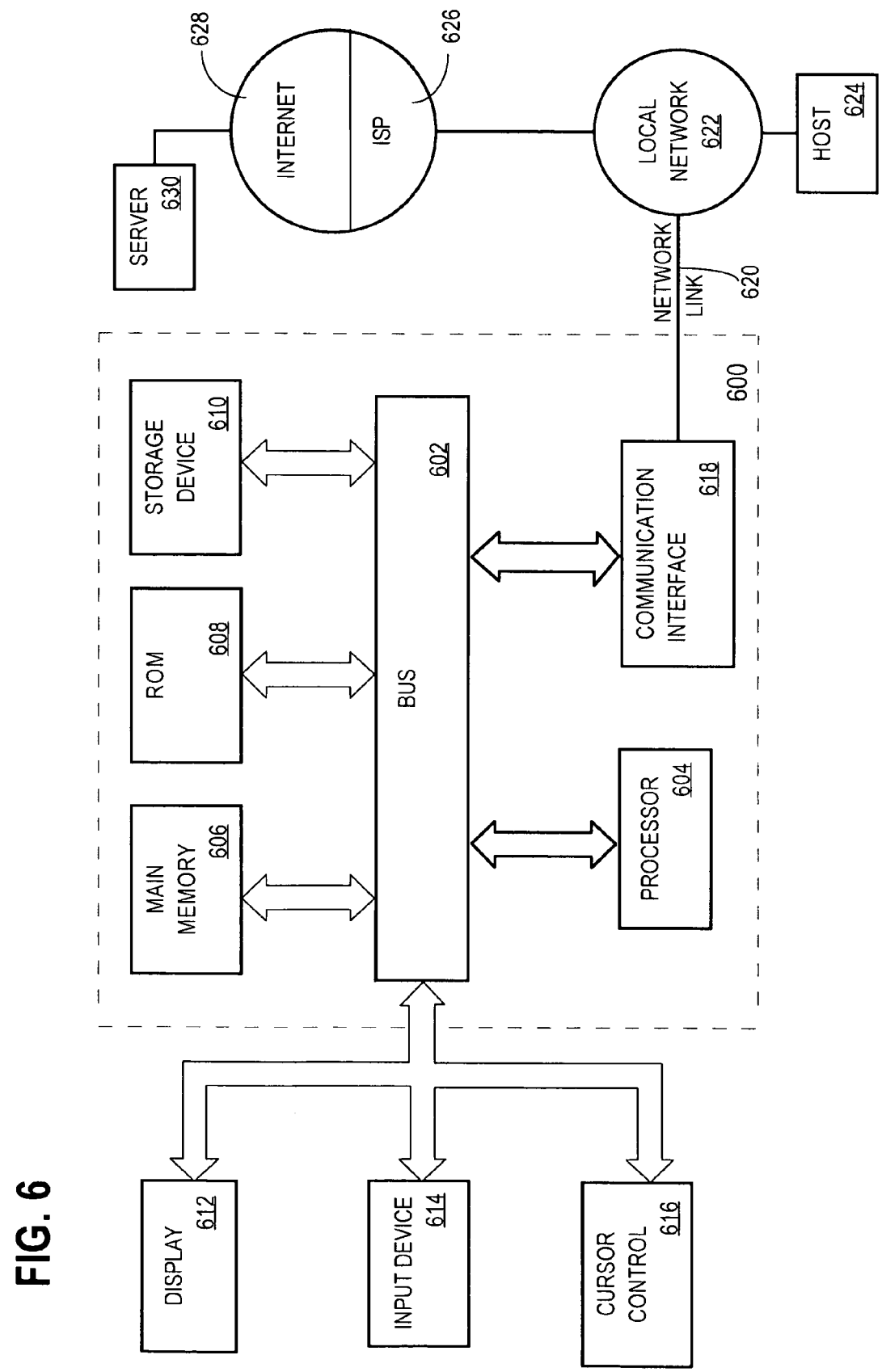
FIG. 6 is a block diagram of a computer system that may be used to implement an embodiment of the present invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer implemented method for managing access to a resource in a multi-node system comprising a plurality of nodes, wherein each of the plurality of nodes includes one or more processors, the method comprising the steps of:
   establishing the resource as a read-mostly resource based on one or more criteria, wherein a first node of plurality of nodes is master of the resource;
   the master receiving a request for an exclusive lock on the resource;
   in response to the master receiving the request for an exclusive lock, the master issuing an anti-lock for the resource to all other nodes of the plurality of nodes; and
   in response to a second node being issued a respective anti-lock for the resource, the second node preventing issuance of a read-mostly lock on the resource while the second node holds the anti-lock.

2. The method of claim 1, further comprising:
   converting the read-mostly lock on the resource into a lock granted by the master; and
   closing all anti-locks on the resource.

3. A computer-readable storage medium storing one or more sequences of instructions which, when executed by one or more processors, causes the one or more processors to perform the method recited in claim 2.

4. The method of claim 1, wherein the criteria is based on access patterns.

5. The method of claim 4, wherein:
   the criteria based on access patterns includes information related to accesses;
   wherein the information related to accesses comprises a mapping of object numbers to the number of read locks and write locks that have been granted to each instance.

6. A computer-readable storage medium storing one or more sequences of instructions which, when executed by one or more processors, causes the one or more processors to perform the method recited in claim 5.

7. A computer-readable storage medium storing one or more sequences of instructions which, when executed by one or more processors, causes the one or more processors to perform the method recited in claim 4.

8. The method of claim 1, further comprising:
   granting an object affinity lock on the resource, wherein the resource has affinity to the requesting instance.

9. A computer-readable storage medium storing one or more sequences of instructions which, when executed by one or more processors, causes the one or more processors to perform the method recited in claim 8.

10. The method of claim 1, wherein the anti-lock is issued to a newly-joined node.

11. A computer-readable storage medium storing one or more sequences of instructions which, when executed by one or more processors, causes the one or more processors to perform the method recited in claim 10.

12. The method of claim 1, wherein the anti-lock issued to the other nodes is remastered among all surviving nodes upon the death of the node.

13. A computer-readable storage medium storing one or more sequences of instructions which, when executed by one or more processors, causes the one or more processors to perform the method recited in claim 12.

14. The method of claim 1, further comprising the second node relinquishing the anti-lock in response to a command from the master.

15. A computer-readable storage medium storing one or more sequences of instructions which, when executed by one or more processors, causes the one or more processors to perform the method recited in claim 14.

16. A computer-readable storage medium storing one or more sequences of instructions which, when executed by one or more processors, causes the one or more processors to perform the method recited in claim 1.

17. A computer implemented method for managing access to a resource in a multi-node system comprising a plurality of nodes, wherein each of the plurality of nodes includes one or more processors, the method comprising the steps of:
   establishing the resource as a read-mostly resource based on one or more criteria, wherein a first node of plurality of nodes is master of the resource;
   based on the resource being established as a read-mostly resource, a second node of the plurality of nodes acquiring a shared lock, not granted by the master, on the resource;
   the master receiving a request for an exclusive lock on the resource;
   in response to the master receiving the request for an exclusive lock, the master issuing an anti-lock for the resource to all other nodes of the plurality of nodes; and
   in response to the second node being issued a respective anti-lock for the resource, the second node:
   relinquishing the shared lock; and
   refraining from issuing a read-mostly lock on the resource while the second node holds the anti-lock.

18. The method of claim 17, wherein the resource is a data block.

19. A computer-readable storage medium storing one or more sequences of instructions which, when executed by one or more processors, causes the one or more processors to perform the method recited in claim 18.

20. The method of claim 17, further comprising:
   partitioning the resource into a plurality of portions; and
   for each portion of said resource, allocating an anti-lock in each node for each portion on which an exclusive lock is held by any node.

21. A computer-readable storage medium storing one or more sequences of instructions which, when executed by one or more processors, causes the one or more processors to perform the method recited in claim 20.

22. A computer implemented method for managing access to a resource in a multi-node system comprising a plurality of nodes, wherein each of the plurality of nodes includes one or more processors, the method comprising the steps of:
- establishing a first node of plurality of nodes as master of the resource;
- wherein, as master of the resource, the first node is the only node of said multi-node system authorized to grant exclusive locks on the resource;
- while said first node is the master of the resource, a second node of the plurality of nodes granting a read-mostly lock on the resource, wherein at the time the second node grants the read-mostly lock on the resource, the second node does not hold a lock, on the resource, granted by the master of the resource; and
- wherein the first node is a different node than the second node.

23. The method of claim 22 wherein:
- the method further comprises the step of, while the first node is master of the resource and the read-mostly lock granted by the second node on the resource is being held, a third node of the plurality of nodes granting another read-mostly lock on the resource;
- at the time the third node grants the other read-mostly lock on the resource, the third node does not hold a lock, on the resource, granted by the master of the resource; and
- the third node is a different node from both the second node and the first node.

24. A computer-readable storage medium storing one or more sequences of instructions which, when executed by one or more processors, causes the one or more processors to perform the method recited in claim 22.

25. A computer-readable storage medium storing one or more sequences of instructions which, when executed by one or more processors, causes the one or more processors to perform the method recited in claim 23.

26. A computer-readable storage medium storing one or more sequences of instructions which, when executed by one or more processors, causes the one or more processors to perform the steps of:
- establishing the resource as a read-mostly resource based on one or more criteria, wherein a first node of plurality of nodes is master of the resource;
- based on the resource being established as a read-mostly resource, a second node of the plurality of nodes acquiring a shared lock, not granted by the master, on the resource;
- the master receiving a request for an exclusive lock on the resource;
- in response to the master receiving the request for an exclusive lock, the master issuing an anti-lock for the resource to all other nodes of the plurality of nodes; and
- in response to the second node being issued a respective anti-lock for the resource, the second node:
  - relinquishing the shared lock; and
  - refraining from issuing a read-mostly lock on the resource while the second node holds the anti-lock.

* * * * *